United States Patent Office 3,346,032
Patented Oct. 10, 1967

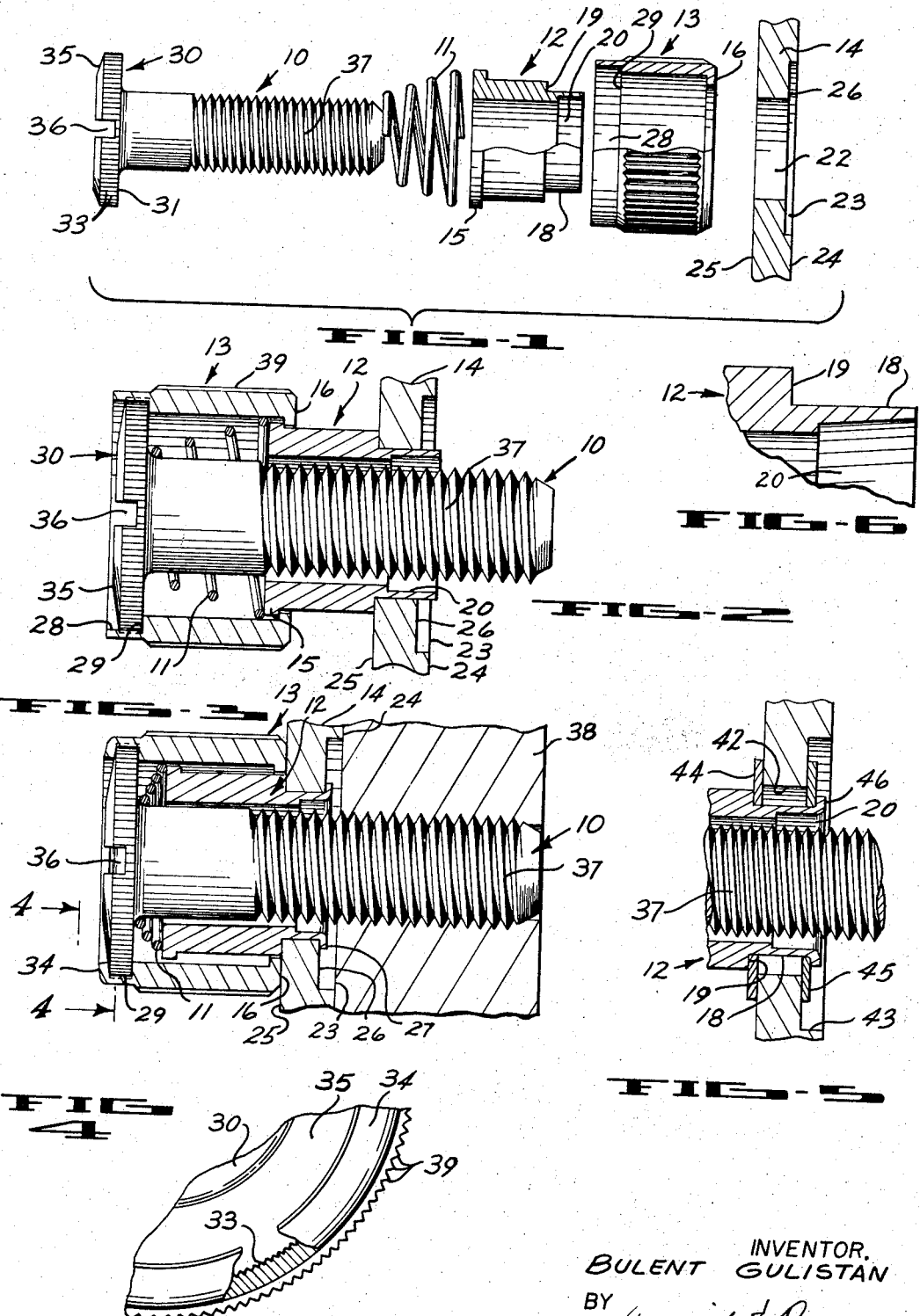

3,346,032
FLOATING CAPTIVE SCREW
Bulent Gulistan, Malibu, Calif., assignor to Deutsch Fastener Corp., Los Angeles, Calif., a corporation of California
Filed Jan. 18, 1966, Ser. No. 521,265
5 Claims. (Cl. 151—69)

ABSTRACT OF THE DISCLOSURE

A captive screw having a pair of telescoping sleeves and a threaded shank extending from one of the sleeves, the other of the sleeves having a shoulder and a thin-walled end portion to be bent over in attaching the sleeve to a workpiece. A spring biases the second sleeve to retract the threaded stud. A pair of annular elements may be included to allow floating movement of the fastener.

The arrangement of this invention provides a captive screw that is both simple and economical to manufacture, and readily installed and used. It avoids extra parts and cumbersome threaded connections where the receptacle for the screw is attached to the workpiece. The fastener includes a first tubular receptacle element having an end portion which fits through an opening in a workpiece, with a radial shoulder in engagement with the surface of the workpiece. The end of this sleeve is bent outwardly to provide an upset head on the other side of the workpiece, cooperating with the shoulder to hold this part of the fastener to the workpiece. This form of attachment greatly simplifies the installation procedure and reduces the cost of the use of the fastener of this invention. Also with the addition of a washer on either side of the workpiece, the connection may provide for lateral floating movement of the fastener. An outer sleeve fits around the first sleeve and is slidable relative to it, being limited in its outward travel relative to the first sleeve by interengageable shoulders on the sleeves. The outer end of the second sleeve is secured to the head of the stud member which extends through the sleeves at their axes. The attachment between the second sleeve and the head is effected by a knurl on the head that fits into a recessed portion in the second sleeve, digging into the material of the sleeve to lock the two elements against relative rotational movement. Then, the outer end of the sleeve is bent over the head, forming a flange that precludes axial movement between the two parts. A spring between the first and second sleeves biases the threaded shank to a retracted position when the fastener is loosened.

An object of this invention is to provide an improved captive screw.

Another object of this invention is to provide a retractable captive screw device that can be easily and rapidly attached to and removed from a workpiece.

A further object of this invention is to provide a captive screw of a small number of parts adapted for low cost mass production.

An additional object of this invention is to provide a retractable screw that can be secured to the workpiece with freedom for floating movement.

Yet another object of this invention is to provide a retractable screw in which the receptacle sleeve is held to the workpiece by an upset flange, avoiding a threaded connection, permitting also a floating connection where desired.

A still further object of this invention is to provide a captive screw device axially shorter than conventional designs, as well as providing a fastener that can be assembled at the factory and supplied to the customer as a single unitary assembly.

These and other objects will become apparent from the following detailed description taken in connection with the accompanying drawing in which:

FIGURE 1 is an exploded side elevational view, partially broken away, of the fastener of this invention;

FIGURE 2 is a longitudinal sectional view of the fastener prior to completion of the attachment of the outer sleeve to the stud and of the inner sleeve to the workpiece;

FIGURE 3 is a longitudinal sectional view of the fastener when complete and in the secured position;

FIGURE 4 is a fragmentary enlarged sectional view, partially in elevation, taken along line 4—4 of FIGURE 3;

FIGURE 5 is a fragmentary sectional view illustrating the connection of the receptacle sleeve to the workpiece where the fastener is to have floating movement; and FIGURE 6 is an enlarged fragmentary sectional view showing the tapered wall of the end of the inner sleeve for facilitating the flanging operation.

The captive screw of this invention is made up of only four parts, which include a screw or stud 10, a conical spring 11, an inner sleeve 12 and an outer sleeve 13. In the completed assembly, the inner sleeve 12 attaches the fastener to the workpiece 14. The inner sleeve 12 is a cylindrical element having an outwardly projecting flange 15 at one end. This is for engagement with an inwardly extending flange 16 on the outer sleeve 13 when the two parts are fitted together. In other words, when the sleeve 13 is fitted over the sleeve 12, it can slide relative to the inner sleeve, but axial movement in one direction is limited by the flanges 15 and 16.

Adjacent the end of the sleeve 12 opposite from the flange 15, the inner sleeve has a cylindrical portion 18 of reduced exterior diameter defining a radial shoulder 19. Slightly beyond the shoulder 19 toward the sleeve end, the inner wall of the sleeve 12 is cut away to provide an annular recess 20.

In securing the fastener to the workpiece 14, a circular opening 22 is cut through the workpiece, dimensioned to generally complementarily receive the reduced diameter portion 18 of the sleeve 12. In addition, a counterbore 23 is formed in the workpiece 14 coaxial with the opening 22 and extending inwardly from the surface 24 of the workpiece. Upon installation, the end 18 of the inner sleeve 12 is inserted into the aperture 22 in the workpiece 14, bringing the shoulder 19 of the sleeve into contact with the surface 25 of the workpiece. A washer could be interposed between the shoulder and the workpiece if desired. The reduced diameter portion 18 is dimensioned relative to the thickness of the workpiece at the opening 22 so that it extends beyond the radial surface 26 of the counterbore 23. With the sleeve positioned in this manner, as seen in FIGURE 2, the end of the section 18 then is bent outwardly to the position of FIGURE 3, forming an upset head to cooperate with the shoulder 19 and hold the sleeve to the workpiece. When this is done, a flange 27 is formed that is received entirely in the counterbore 23. The shoulder and flange in effect provide spaced abutments that prevent axial movement of the sleeve. With the flange 27 in the counterbore 23, there is a flush installation with nothing projecting outwardly beyond the surface 24 of the workpiece 14. Of course, the counterbore 23 may be omitted where a flush surface is not needed.

This secures the fastener to the workpiece 14 very rapidly, and much more readily than in prior designs where threaded connections were utilized and more parts were necessary. A suitable tool can flare out the flange 27 from the end 18 of the sleeve 12 in a moment of time to give a complete and secure attachment. Vibrations or other forces will not cause the sleeve 12 to become dislodged from the workpiece 14. The flange 27 must be bent back to its original form or cut away in order to permit removal of the fastener from the workpiece 14. Removal can be accomplished quite easily through the use of an appropriate tool to pull outwardly on the receptacle sleeve 12, which will cause the necessary bending of the flange to allow the sleeve 12 to separate from the workpiece 14. Thus, while removal is readily achieved when required, there is no danger of the sleeve's inadvertently becoming loosened during service.

The cylindrical outer sleeve 13, at the end portion opposite from the flange 16, is of increased diameter internally to provide an annular recess 28, resulting in a radial shoulder 29 inwardly of the end of the sleeve. Upon assembly of the fastener, the relatively thin flat head 30 of the stud 10 fits within the annular recess 28, with its under surface 31 being brought into engagement with the shoulder 29. The head 30 is provided with a straight knurl 33 on its circumferential surface. The diameter of the knurled periphery of the head is proportioned relative to the diameter of the recess 28 such that it will dig into the inner surface of the sleeve 13 at the location of this recess when the sleeve and stud are brought together. Consequently, when the head 30 is forced into the end of the sleeve 13 to the position of FIGURE 2, the teeth formed by the knurl 33 will become embedded in the inner surface of the sleeve and couple the sleeve 13 and stud 10.

After the head has been introduced into the end of the sleeve 13 in this manner, with the outer end of the sleeve 13 projecting beyond it, the end portion of the sleeve is bent inwardly to form a flange 34 extending over the end of the head 30. The flange 34 is caused in this manner to lie upon the outer periphery of the frustoconical part 35 of the head. This leaves the slot 36 free for engagement by the bit of a screwdriver for rotating the stud 10.

Prior to securing the sleeve 13 to the stud 10, the spring 11 is fitted within the outer sleeve, between the end of the inner sleeve 12 and the undersurface 31 of the head 30 of the screw. With the outer sleeve 13 and screw 10 rotationally coupled and locked axially relative to each other, the spring 11, therefore, will bias the sleeve 13 outwardly until the flange 16 of that sleeve is brought into engagement with the flange 15 of the inner sleeve 12. This causes the shank 37 of the screw 10 to be retracted relative to the receptacle formed by the fixed inner sleeve 12.

In using the fastener, the assembly of the outer sleeve 13 and stud 10 is pushed inwardly against the resisting force of the spring 11, causing the shank 37 to engage the threaded opening in the mating part 38. The driving force for the screw may be applied through the slot 36. Also, a straight knurl 39 is formed on the exterior circumferential surface of the outer sleeve 13, so that it is readily rotated by hand.

In construction and use of the fastener of this invention, the stud 10 and outer sleeve 13 will be secured together prior to association of the device with the workpiece to provide a unitary stud assembly. FIGURE 2, therefore, is illustrative only in this regard, showing the sleeve 13 in the position prior to bending the flange 34 inwardly, when actually this would have been accomplished before the device was inserted into the workpiece 14 as illustrated. In any event, the attachment between the screw 10 and the outer sleeve 13 is accomplished rapidly and easily, mechanically locking these elements together both axially and rotationally. No welding, brazing or auxiliary fastening elements are necessary in making the connection between these parts. The elements of the fastener are assembled at the factory so that the user need purchase and stock only a single part. This simplifies use of the fastener and reduces inventory requirements for the purchaser.

The fastener constructed in accordance with this invention is much shorter than ordinary captive screws, projecting beyond the surface 25 of the work piece only a small distance even when the fastener is loosened. This results from the attachment of the head of the stud at the outer end of the external sleeve, and the positioning of the abutment shoulders for the two sleeves at their ends. Also, the provision of a conical spring allows that member to collapse axially to a minimum dimension when the shank is threaded into the mating part. The ability to provide a full stroke of movement for the threaded shank, while still making the fastener compact axially, gives the design of this invention a further advantage over conventional construction.

In the arrangement illustrated in FIGURES 2 and 3, the receptacle sleeve 12 is rigidly attached to the workpiece 14, so that there is no movement between these elements. Frequently, however, it is desirable for fasteners of this type to be permitted limited floating movement. This may be important, for example, where several of the fasteners are held to a single panel, and the floating movement is needed to permit engagement with the threaded openings of the mating structure regardless of misalignment of the parts or the openings formed in them. The design of this invention can provide for full floating movement without modification through the simple expedient of adding two washers at the point of connection.

Such a use of the fastener may be seen in FIGURE 5, where the workpiece 41 is provided with an opening 42 through it that is larger than the section 18 at the end of the receptacle sleeve 12. Customarily, a counterbore 43 will be provided at the far side of the opening 42. In attaching the sleeve 12 to the workpiece 41, washers 44 and 45 are included around the sleeve at either end of the opening 42. The washers are smaller internally than the shoulder 19 and flange 46, but are substantially greater in outside diameter than the shoulder and flange. Therefore, the washers 44 and 45 overlap the workpiece 41 at either end of the opening 42. This retains the fastener to the workpiece. Floating movement is permitted because the opening 42 is made larger in diameter than the diameter of the section 18 of the sleeve that extends through the workpiece. Hence, the sleeve 12 can move laterally within the opening 42, so that the fastener has freedom for a substantial amount of floating movement relative to the workpiece. The washers 44 and 45 are sufficiently larger in outside dimension than the dimension of the opening 42 to retain the sleeve 12 to the workpiece under all conditions, despite a considerable amount of floating movement made possible by the clearance between the sleeve and the circumference of the opening.

In this arrangement, preferably the flange 46 is not bent as tightly against the washer 45 as would the flange 27 be bent against the radial surface 26 in the counterbore 23. In other words, the distance between the shoulder 18 and the flange 46 may be slightly greater than the combined thicknesses of the washers and the workpiece at the opening. This is so the washers 44 and 45 will not frictionally hold against the surfaces of the workpiece, but permit free lateral sliding movement in the floating action.

All the previously noted advantages of the fastener and its mode of attachment to the workpiece are retained by this construction, which gives the added feature of the floating connection.

For either the floating or the fixed attachment to the workpiece, more consistently satisfactory results in the flaring of the end of the inner sleeve 12 can be obtained if the wall at the end portion of the sleeve is tapered. This is illustrated in the enlarged fragmentary sectional view of FIGURE 6, where the amount of taper is exaggerated slightly. While the outer periphery of the end portion 18 is of constant diameter, the inner circumferential wall of the recess 20 is inclined relative to the axis so that the wall thickness tapers toward the outer end. The advantage in tapering the wall in this manner is that it gives more assurance that the flange 27 will be bent outwardly beyond the surface of the opening that receives it, without at the same time distorting the sleeve within the opening. With the wall thickness decreasing toward the outer end, the portion of the wall beyond the opening always will be thinner than that inwardly of the opening regardless of the thickness of the workpiece to which the sleeve is attached. Consequently, when the flaring tool reacts against the inside of the sleeve, the sleeve will begin to bend first at the outer portion and a smoothly formed flange will result. With a constant wall thickness, on the other hand, occasionally some bending of the sleeve will occur slightly inwardly of the portion intended for the flange, so that some distortion of the sleeve will take place. The amount of wall taper need not be great to avoid this occurrence, satisfactory results being realized in a typical design where the inner wall is inclined 2° relative to the sleeve axis.

The foregoing detailed description is to be clearly understood as given by way of illustration and example only, the spirit and scope of this invention being limited solely by the appended claims.

I claim:

1. In combination with a workpiece having an opening therethrough, a fastener comprising
  a first sleeve,
  a second sleeve circumscribing said first sleeve and being slidably received thereon, said first sleeve having generally radially outwardly extending means and said second sleeve having generally radially inwardly extending means cooperating with one another to limit the relative axial movement between said sleeves,
  a stud means, said stud means having a threaded shank extending through said first and second sleeves, said stud means being attached to said second sleeve and rotatable relative to said first sleeve, and axially movable relative to said first sleeve to advance said threaded shank out of one end of said first sleeve for engagement with a threaded opening of a mating part,
  resilient means engaging said stud means for resisting said advancement of said threaded shank and returning said threaded shank to a retracted position relative to said first sleeve upon disengagement of said mating part,
  said first sleeve on the exterior surface thereof having a radially directed annular shoulder axially inwardly of said one end thereof, and a radially directed annular flange axially outwardly of said shoulder,
  and a duality of generally flat annular members circumscribing said first sleeve, the first of said annular members being adjacent said annular shoulder and the second of said annular members being adjacent said annular flange, said first and second annular members having circumferentially continuous inner and outer peripheries and being larger laterally than said annular shoulder and its annular flange, respectively,
  said first sleeve intermediate said annular shoulder and annular flange extending through said opening in said workpiece and being of smaller lateral dimension than that of said opening, whereby said first sleeve is movable laterally relative to said workpiece,
  said annular members overlapping said workpiece at either end of said opening for thereby holding said first sleeve to said workpiece while permitting said lateral movement.

2. A device as recited in claim 1 in which
  said first sleeve adjacent said one end is recessed internally providing a reduced wall thickness for facilitating outward bending of said flange.

3. In combination with a workpiece having an opening therethrough, a fastener comprising
  a first sleeve, said first sleeve having an outwardly extending shoulder means at one end thereof,
  a second sleeve circumscribing said first sleeve, said second sleeve being axially slidable relative to said first sleeve and at one end thereof having inwardly extending shoulder means for engagement with said shoulder means of said first sleeve and limiting relative axial movement between said first and second sleeves,
  stud means carried by said second sleeve and extending axially through said sleeves for extension beyond the opposite end of said first sleeve and engagement with the mating opening of an adjacent workpiece,
  resilient means biasing said stud means to a retracted position relative to said sleeves so as to bring said shoulder means for said first and second sleeves into interengagement,
  said first sleeve having a radially directed shoulder axially inwardly of said opposite end thereof and having a radially directed flange at said opposite end, said first sleeve intermediate said shoulder and flange being received in said opening in said workpiece and being of smaller diameter than said opening, whereby said first sleeve has freedom for lateral floating movement relative to said workpiece,
  a first generally flat washer circumscribing said first sleeve adjacent said shoulder, and a second generally flat washer circumscribing said first sleeve adjacent said flange, said washers having circumferentially continuous inner and outer peripheries and having greater diameters than said shoulder and flange, and engaging opposite surfaces of said workpiece at either end of said opening for thereby retaining said first sleeve to said workpiece.

4. A device as recited in claim 3 in which said first sleeve has a wall tapering in thickness such that said wall is progressively thicker from the outer edge of said flange to a location axially inwardly of said flange.

5. In combination with a workpiece having an opening therethrough from a first surface to a second surface thereof, a captive screw device comprising
  a first sleeve, said first sleeve having a radially outwardly extending flange at one end thereof, a cylindrical portion extending inwardly from said one end, a second cylindrical portion of reduced external diameter extending inwardly from the opposite end of said first sleeve, said second cylindrical portion being of smaller diameter than said opening and extending therethrough, and a radially directed shoulder intermediate said first and second cylindrical portions,
  a first generally flat washer having circumferentially continuous inner and outer peripheries circumscribing said first sleeve adjacent said shoulder and being of greater external diameter than said shoulder, said sleeve at said opposite end being bent outwardly to provide a flange on said opposite end of said sleeve,
  a second generally flat washer having circumferentially continuous inner and outer peripheries circumscribing said first sleeve adjacent said flange and being of greater external diameter than said flange, said first and second washers overlapping said first and second surfaces of said workpiece, respectively, at the ends of said opening for cooperating with said shoulder and flange to provide an attachment for said first sleeve to said workpiece while permitting limited lateral floating movement of said first sleeve relative to said workpiece,
  a second sleeve, said second sleeve having a radially inwardly extending flange at one end thereof and slidably receiving said first sleeve, said radially extending flanges of said first and second sleeves being interengageable for limiting the relative axial movement of said first and second sleeves in one direction, a stud, said stud having a shank having threads thereon, said shank extending axially through said sleeves, said stud having a head, said second sleeve at the opposite end thereof being connected to said head of said stud, said head having a driving recess therein for receiving a driving tool, and a spring interposed between said one end of said first sleeve and said head for biasing said stud and with it said second sleeve in said one direction to bring said radially extending flanges of said first and second sleeves into interengagement.

References Cited

UNITED STATES PATENTS

| 2,470,927 | 5/1949 | Hale | 151—69 |
| 2,831,520 | 4/1958 | Clarke | 151—69 |
| 3,245,450 | 4/1966 | Sauter | 151—69 |

FOREIGN PATENTS 558,456    6/1958    Canada.

CARL W. TOMLIN, *Primary Examiner.*

R. S. BRITTS, *Assistant Examiner.*